United States Patent
Hagspiel et al.

(10) Patent No.: US 9,606,891 B2
(45) Date of Patent: Mar. 28, 2017

(54) TRACING DATA FROM AN ASYNCHRONOUS INTERFACE

(71) Applicant: INTERNATIONAL BUSINESS MACHINES CORPORATION, Armonk, NY (US)

(72) Inventors: Norbert Hagspiel, Wendlingen (DE); Sascha Junghans, Ammerbuch (DE); Matthias Klein, Boeblingen (DE); Joerg Walter, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/733,249

(22) Filed: Jun. 8, 2015

(65) Prior Publication Data

US 2015/0365225 A1    Dec. 17, 2015

(30) Foreign Application Priority Data

Jun. 12, 2014   (GB) .................................. 1410488.9

(51) Int. Cl.
| | |
|---|---|
| H04L 7/02 | (2006.01) |
| H04L 7/00 | (2006.01) |
| G06F 11/34 | (2006.01) |
| G06F 11/30 | (2006.01) |

(52) U.S. Cl.
CPC ........ G06F 11/348 (2013.01); G06F 11/3027 (2013.01); G06F 2201/86 (2013.01)

(58) Field of Classification Search
CPC .................................... H04L 7/00; H03L 7/00
See application file for complete search history.

(56) References Cited

U.S. PATENT DOCUMENTS

| | | |
|---|---|---|
| 7,315,600 B2 | 1/2008 | Sigurdsson et al. |
| 8,132,036 B2 | 3/2012 | Pothireddy et al. |

(Continued)

FOREIGN PATENT DOCUMENTS

| | | |
|---|---|---|
| JP | 2011170654 A | 9/2011 |
| WO | WO2009069094 A1 | 6/2009 |

OTHER PUBLICATIONS

Search Report under Section 17(5) dated Dec. 1, 2014, pp. 1-4.

(Continued)

*Primary Examiner* — Ross Varndell
(74) *Attorney, Agent, or Firm* — Steven Chiu; Matthew M Hulihan; Heslin Rothenberg Farley & Mesiti PC (57) ABSTRACT

An apparatus for tracing data from a data bus in a first clock domain operating at a first clock frequency to a trace array in a second clock domain operating at a second clock frequency, wherein the first clock frequency is lower than the second clock frequency. The apparatus includes a change detector to detect a change of the data on the data bus in the first clock domain, a trigger responsive to the change detector to send a trigger pulse to the second clock domain, pulse synchronization on the second clock domain responsive to the trigger pulse to synchronize the trigger pulse to the second clock frequency of the second clock domain by a meta-stability latch, as well as a data capture in the second clock domain responsive to the pulse synchronization to capture data from the data bus and to store the captured data in the trace array.

19 Claims, 4 Drawing Sheets

(56) References Cited

U.S. PATENT DOCUMENTS

| | | | | |
|---|---|---|---|---|
| 8,407,528 B2* | 3/2013 | Larson | ................ | G06F 11/3476 |
| | | | | 714/45 |
| 2005/0285640 A1 | 12/2005 | Nakamura | | |
| 2006/0161818 A1 | 7/2006 | Tousek | | |
| 2007/0180269 A1* | 8/2007 | Irish | .................... | G06F 12/1475 |
| | | | | 713/193 |
| 2009/0225915 A1* | 9/2009 | Hassan | ................ | H04L 7/0012 |
| | | | | 375/354 |
| 2011/0209003 A1* | 8/2011 | Matsukawa | ............. | G06F 13/38 |
| | | | | 714/30 |
| 2015/0214933 A1* | 7/2015 | Sehgal | ................ | H03K 19/096 |
| | | | | 326/94 |

OTHER PUBLICATIONS

Hopkins, Andrew et al., "Debug Support Strategy for Systems-on-Chips with Multiple Processor Cores," IEEE Transactions on Computers, vol. 55, No. 2, Feb. 2006, pp. 174-184.

Hsieh, Ming-Chang, "An Embedded Infrastructure of Debug and Trace Interface for the DSP Platform," Design Automation Conference, 45$^{th}$ ACM/IEEE, Jun. 2008, pp. 866-871.

* cited by examiner

TRACING DATA FROM AN ASYNCHRONOUS INTERFACE

PRIOR FOREIGN APPLICATION

This application claims priority from United Kingdom patent application number 1410488.9, filed Jun. 12, 2014, which is hereby incorporated herein by reference in its entirety.

BACKGROUND

One or more aspects relate in general to data processing systems, and in particular, to tracing data from an asynchronous interface for debugging purposes.

Asynchronous data transfers have become very common in many integrated circuit devices, such as application-specific integrated circuits (ASICs) and system-on-chips (SoCs). In particular, various components or subsystems utilized for the construction of an integrated circuit may independently operate at different frequencies, such as in microprocessors and micro-controllers, where certain components or subsystems have a faster rate of operation than the operating frequencies of other system components or subsystems. Therefore, typically, it is desirable to devise integrated circuits with the ability to support multiple domains, which may operate at different frequencies.

For instance, many integrated circuits include a number of electronic circuits referred to as "clocked logic domains" that operate independently based on electrical "timing" or "clock" signals. Such clock signals are used to control and coordinate the activities of various components or subsystems. Since there will not be a fixed relationship between the active edge of a launch clock and a capture clock, there is a possibility of having setup or hold violations in the capture flip-flop, causing meta-stability. To avoid meta-stability in asynchronous data transfer, a commonly adopted technique is to double latch (also called double stage synchronization, or double flopping) the clock domain crossing signal at the receive domain clock frequency. Double flopping involves passing an asynchronous signal through a pair of edge triggered D-Flip-flops or some equivalent storage element. If the receiving clock frequency is considerably less than the transmitting clock frequency, there is a huge latency involved in the double flopping process, often up to 20 or more clock cycles in the higher frequency domain. This situation frequently arises with slower devices, like a Flash Memory controller, being used in ASICs that have a majority of the components running at a much higher clock frequency. Any reduction in the clock domain-crossing overhead significantly reduces the data transfer latencies and increases the overall system performance.

A variety of devices and methods are used in conjunction with the use of debug trace data in a system. The trace data can be passed between several different components in the circuit. Established protocols allow the different components to communicate with each other. One example involves a microprocessor circuit system. As the demand for more powerful and/or faster systems increases, design constraints, such as power consumption and heat dissipation, can become increasingly problematic.

U.S. Pat. No. 8,132,036 B2, hereby incorporated herein by reference in its entirety, discloses a method and an interfacing circuit for transmitting data between a first clock domain operating at a first clock frequency C1 and a second clock domain operating at a second clock frequency C2. In accordance with this, data is transmitted from the first domain, through an interfacing circuitry, and to the second domain. The interfacing circuitry includes a synchronization section that operates at a third frequency C3, wherein C3 is a whole number multiple of C2. For example, C3 may be an even whole number multiple of C2.

Thus in U.S. Pat. No. 8,132,036 B2, a clock signal A is used to operate the second clock domain at frequency C2, and a clock signal B is used to operate the second section of the interfacing circuitry at frequency C3. Each of the clock signals A and B have regular, active edge portions, and each occurrence of one of the active edge portions of clock signal A is clock aligned with one of the active edge portions of clock signal B. Clock signals A and B are source synchronized.

In U.S. Pat. No. 8,132,036 B2, the synchronization section of the interfacing circuitry includes first and second registers. Clock signal B is applied to both the first and second registers to operate these registers at frequency C3. In an asynchronous data transfer, the higher clock frequency that launches data may be C1 and the lower clock frequency that captures data may be C2. In accordance with this, the interface flip-flops used for double flopping run at a higher source synchronous clock frequency C3. C3 is source synchronized with the low frequency clock C2, and C3 and C2 have a common active edge and will be considered synchronous.

SUMMARY

An apparatus is provided for tracing data from a data bus in a first clock domain. The apparatus includes, for instance, a change detector to detect a change of the data on the data bus in the first clock domain, the first clock domain operating at a first clock frequency; a trigger responsive to the change detector to send a trigger pulse to the second clock domain, the second clock domain operating at a second clock frequency, wherein the first clock frequency is lower than the second clock frequency; a pulse synchronization on the second clock domain responsive to the trigger pulse to synchronize the trigger pulse to the second clock frequency of the second clock domain by a meta-stability latch; and a data capture in the second clock domain responsive to the pulse synchronization to capture data from the data bus and to store the captured data in the trace array.

BRIEF DESCRIPTION OF THE DRAWINGS

One or more aspects of the present invention may best be understood from the following detailed description of the embodiments, but not restricted to the embodiments, wherein is shown in.

DETAILED DESCRIPTION

In the drawings, like elements are referred to with equal reference numerals. The drawings are merely schematic representations, not intended to portray specific parameters of aspects of the invention. Moreover, the drawings are intended to depict only typical embodiments of the invention and therefore should not be considered as limiting the scope of the invention.

Figure 1:
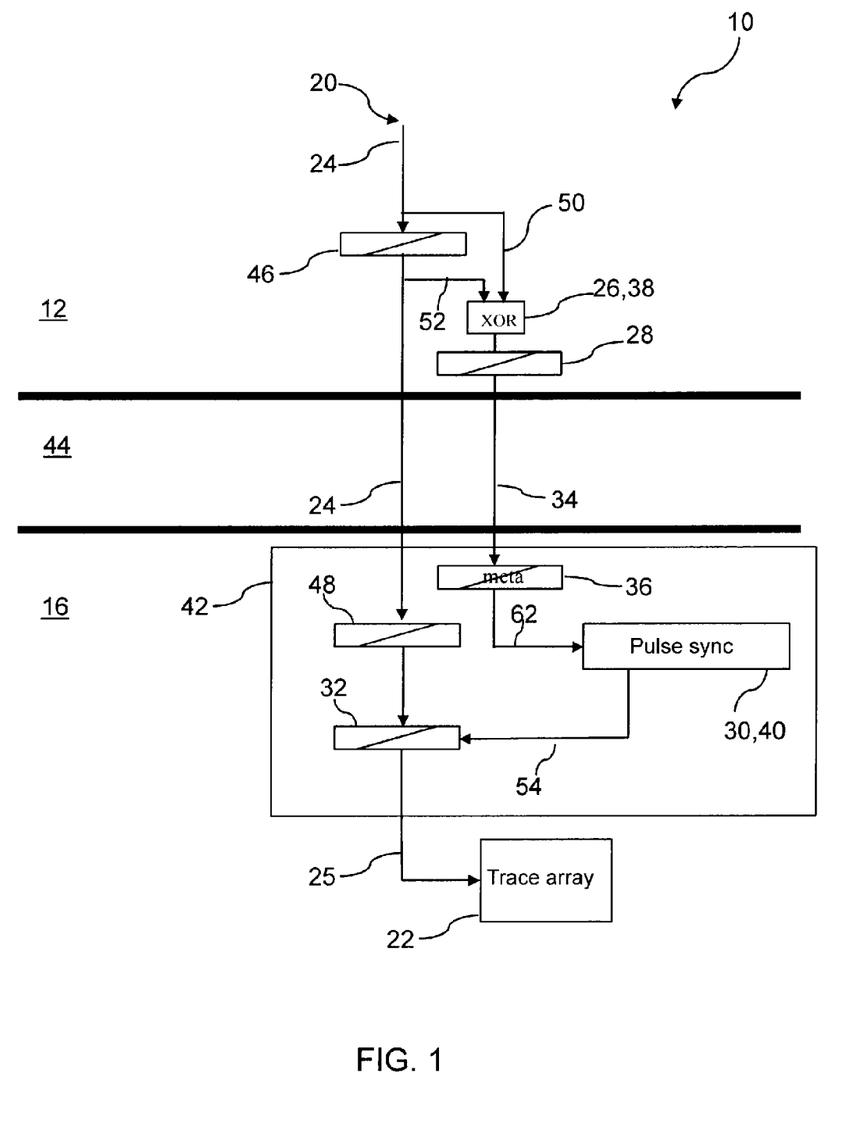
FIG. 1 an apparatus for tracing data from a data bus in a first clock domain operating at a first clock frequency to a trace array in a second clock domain operating at a second clock frequency according to an embodiment of the invention.

FIG. 1 depicts an apparatus 10 for tracing data 24 from a data bus 20 in a first clock domain 12 operating at a first clock frequency 14 (FIG. 2) to a trace array 22 in a second clock domain 16 operating at a second clock frequency 18 (FIG. 2) according to an embodiment of the invention. The apparatus 10 is used for tracing data 24 from a data bus 20 by capturing a change of the data 24 on the data bus 20. The apparatus 10 comprises change detector means 26 to detect a change of the data 24 on the data bus 20 in the first clock domain 12, trigger means 28 responsive to the change detector means 26 to send a trigger pulse 34 to the second clock domain 16, pulse synchronization means 30 on the second clock domain 16 responsive to the trigger pulse 34 to synchronize the trigger pulse 34 to the second clock frequency 18 of the second clock domain 16 by a meta-stability latch 36, as well as data capture means 32 in the second clock domain 16 responsive to the pulse synchronization means 30 to capture data 24 from the data bus 20 and to store the captured data 25 in the trace array 22.

Figure 2:
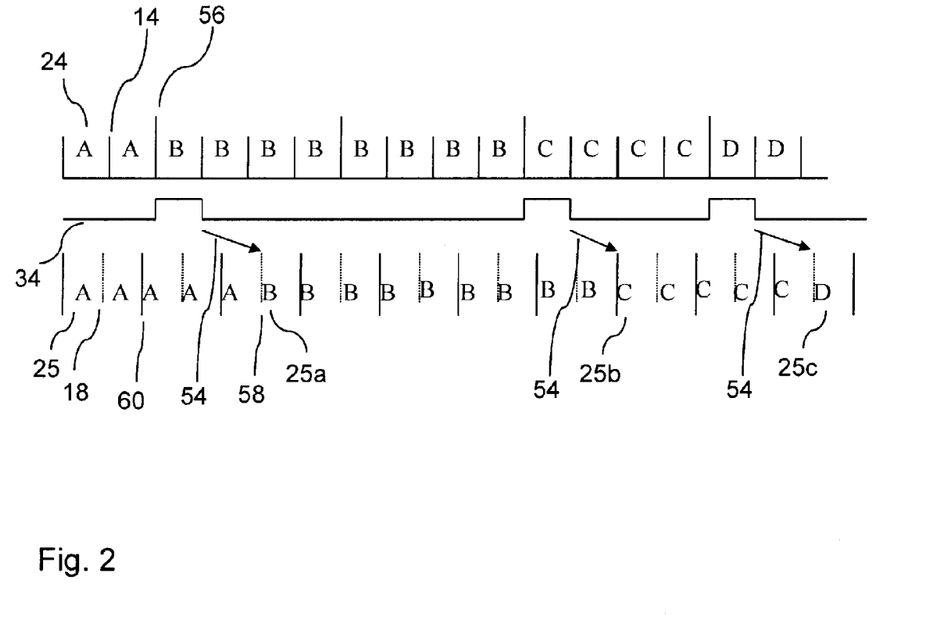
FIG. 2 a timing diagram for tracing data from a data bus in a first clock domain to a trace array in a second clock domain according to an aspect of the invention.

The first clock frequency 14 hereby is lower than the second clock frequency 18. In the embodiment shown, the second clock frequency may be a core clock frequency of a computer system or computer net of, e.g., 4 GHz. Then the pulse synchronization and data capture means could be operating at the second clock frequency 18, e.g., 4 GHz, wherein writing the data into the trace array could be performed at half of the second clock frequency 18, e.g., 2 GHz. The apparatus 10 is configured so that the data 24 and the trigger pulse 34 are flowing from the first clock domain 12 to the second clock domain 16. The change detector means 26 comprises an EXCLUSIVE-OR (XOR) circuit 38, whereas the pulse synchronization means 30 comprises a programmable delay 40 for synchronization of the data capture means 32. The apparatus 10 is configured so that data capturing into the data capture means 32 is controllable by the programmable delay 40 of the pulse synchronization means 30. Further the apparatus 10 is configured so that the data capture means 32 allows a direct capture of tracing data 24 from the first clock domain 12.

The apparatus 10 solves the problem of tracing data 24 from a data bus 20, which may be implemented as a debug interface operating asynchronously in one clock domain 12, to another clock domain 16 operating at a different clock frequency 18. As is illustrated in FIG. 2 (and with reference to reference numerals of FIG. 1), the data bus 20, e.g., may be operating in the first clock domain 12 with an 'aclk' cycle, which is asynchronous to a core clock with an 'nclk' cycle. The data bus 20 may be changing its value every 4 'aclk' cycles. This data 24 is to be traced in a trace array 22 inside the second clock domain 16 which, e.g., may be operating with a '2×nclk' cycle, synchronous to the fast core clock. Assumptions for the clock frequencies 14, 18 expressed in cycles may be that 'aclk' cycle time is less than 'nclk' cycle time. Because the data bus 20 shall only be traced in a way, such that no data value is lost, the data value may be traced in one or more '2×nclk' cycles. With one aspect of the apparatus 10, every 'new' data value is written at least one time into the trace array 22 and it is written until the next 'new' data value is available to be written.

Thus the method for tracing data 24 from a data bus 20 by capturing a change of the data 24 on the data bus 20 comprises detecting a change of the data 24 on the data bus 20 of the first clock domain 12 by means of change detector means 26, sending a trigger pulse 34 to the second clock domain 16 by means of trigger means 28 responsive to the change detector means 26, synchronizing the trigger pulse 34 to the second clock frequency 18 of the second clock domain 16 by a meta-stability latch 36 by means of pulse synchronization means 30 of the second clock domain 16, the pulse synchronization means 30 being responsive to the trigger pulse 34, capturing data 24 from the data bus 20, and storing the captured data 25 in the trace array 22 by means of data capture means 32 on the second clock domain 16, the data capture means 32 being responsive to the pulse synchronization means 30.

The data 24, available on the data bus 20 in the first clock domain 12, is fed to the change detector means 26 realized as the EXCLUSIVE-OR (XOR) circuit in the embodiment shown in FIG. 1, via a data detection line 50 with the data 24 from the data bus 20. Parallel, the data 24 is fed to the latch 46, where after the latch 46 a second data detection line 52 with the data 24 from the data bus 20 is fed to the change detector means 26. Thus it can be detected if the data 24 on the data bus 20 is changed. The output of the change detector means 26 is fed to the trigger means 28, another latch, where a trigger pulse 34 is generated and this trigger pulse 34 as a new data available signal is fed through the domain boundary 44 to the second clock domain 16 into the meta-stability latch 36, being part of the tracing interface 42, operating at a frequency half the second clock frequency 18. The trigger pulse 34 thus is synchronized to the second clock frequency 18 of the second clock domain 16 by starting the pulse synchronization via the start pulse synchronization signal 62 in the pulse synchronization means 30, which is implemented with a programmable delay 40. From the pulse synchronization means 30 the trigger pulse 34 as a data capture signal 54 is fed to the data capture means 32 where the data 24 from the data bus 20 arrived through the latch 48. If the data capture signal 54 as a new data stable signal is fed to the data capture means 32, the data 25 as a data bus trace is sent to the trace array 22 and stored.

In FIG. 2 (with reference to reference numerals of FIG. 1) a timing diagram for tracing data 24 from a data bus 20 in a first clock domain 12 to a trace array 22 in a second clock domain 16 according to one or more aspects is shown. The data 24 on the data bus 20, named A, B, C, D in FIG. 2, is available on the data bus 20 in the first clock domain 12 with a first clock frequency 14, which is represented in FIG. 2 as a short mark. The data 24 may change on the data bus 20 every four cycles, represented as a longer mark 56. If a change in the data 24 is detected by the change detector means 26, a trigger pulse 34 will be sent to the second clock domain 16 and a pulse synchronization of the trigger pulse 34 to the second clock frequency 18 will be executed in order to generate a data capture signal 54, signaling that the new data 25 is valid and may be captured into the trace array 22. The second clock domain is operating with a second clock frequency 18, e.g., a core clock of a computer system or computer net. The pulse synchronization is executed with a pulse synchronization frequency 58 of the second clock frequency 18, whereas writing the captured data 25 into the trace array 22 is executed with a data capture frequency 60 of half of the second clock frequency 18, represented as a long mark. The change of the traced data 25 is marked with 25a, 25b, 25c in FIG. 2.

Figure 3:
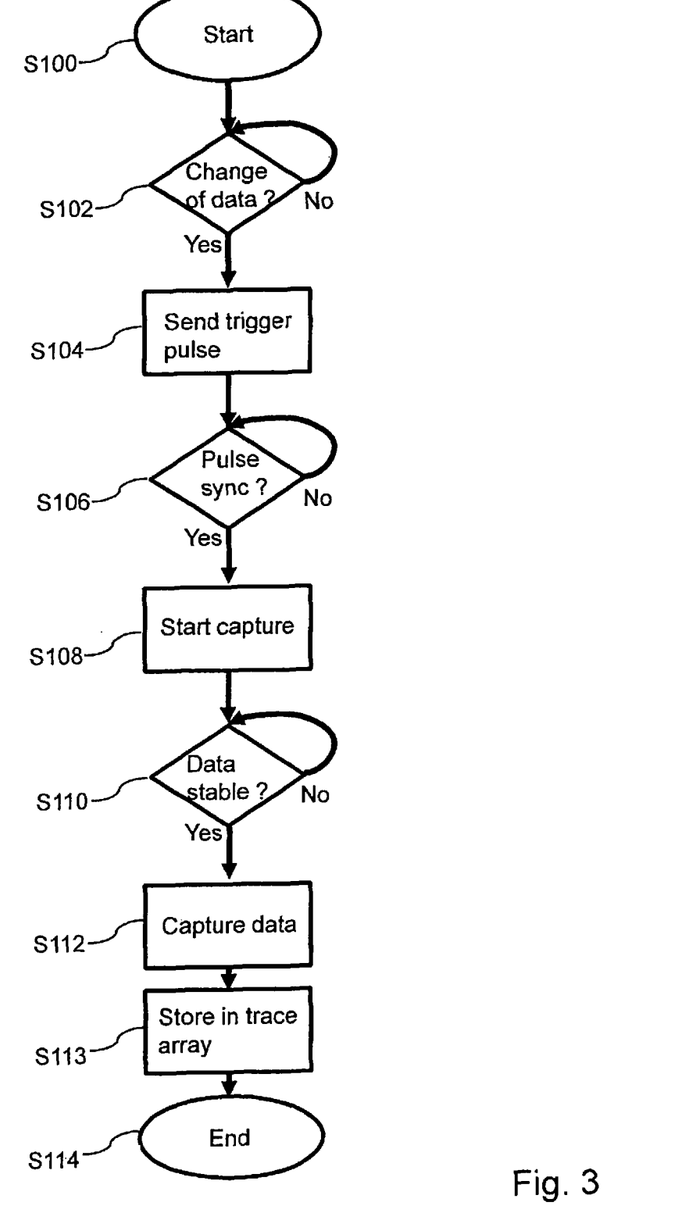
FIG. 3 a flowchart for tracing data from a data bus in a first clock domain to a trace array in a second clock domain according to an aspect of the invention.

FIG. 3 depicts a flowchart for tracing data 24 from a data bus 20 in a first clock domain 12 to a trace array 22 in a second clock domain 16 according to one or more aspects of the invention. The tracing process starts at step S100. Then the change detector means 26 is continuously checking in step S102 if there is new data 24 available on the data bus 20. If this is the case, a trigger pulse 34 is generated by the trigger means 28 in step S104. This trigger pulse 34 is sent to the meta-stability latch 36 in order to perform pulse synchronization in the pulse synchronization means 30 after having started the pulse synchronization by the start pulse synchronization signal 62. If this step S106 is successful (Yes), data capturing is started in step S108. If the data capture in step S110 is stable (Yes), the trigger pulse 34 as a data capture signal 54 is sent to the data capture means 32 and thus the data 24 is captured, step S112, and stored in the trace array 22 in step S113. This ends the tracing process in step S114.

Figure 4:
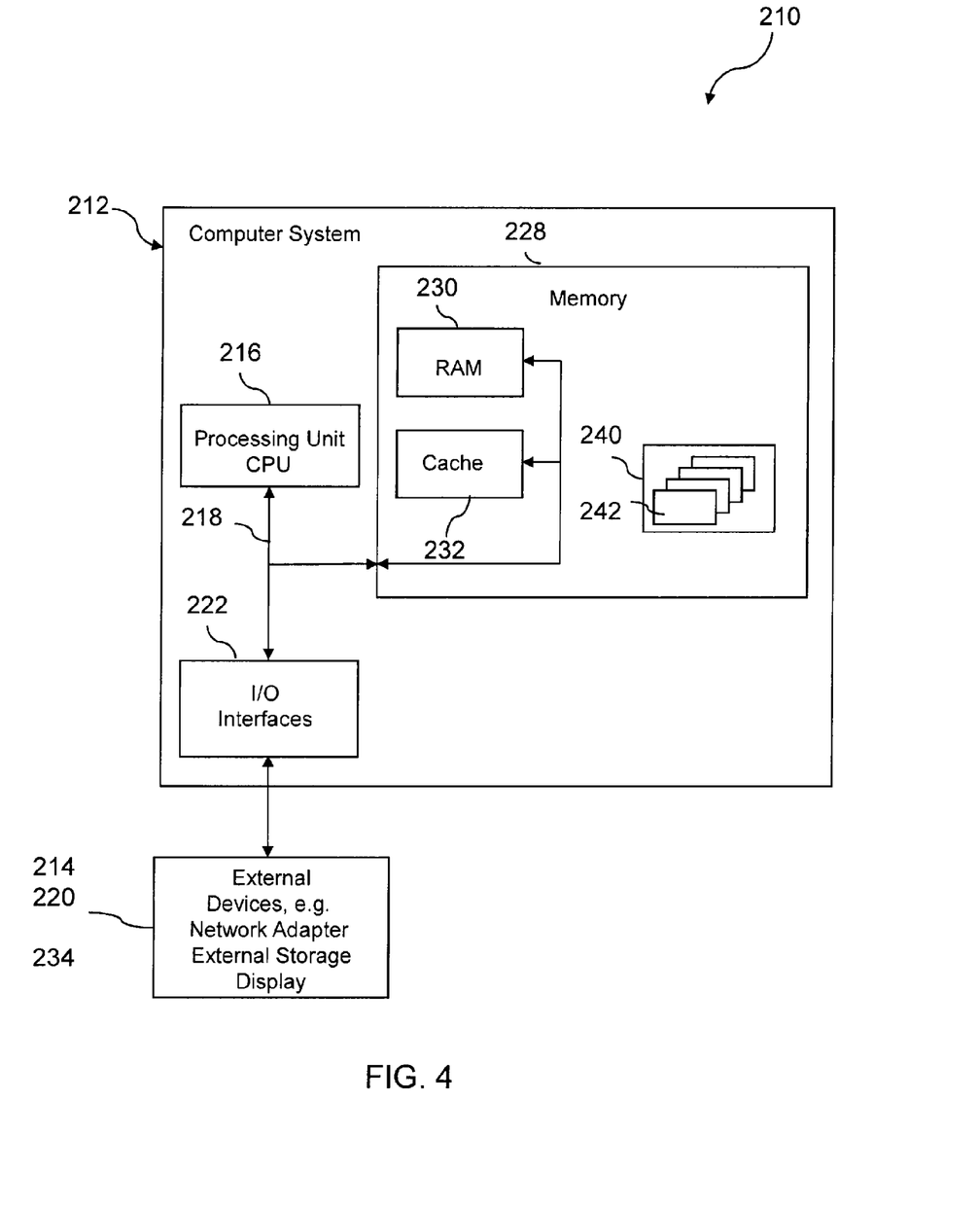
FIG. 4 an example embodiment of a data processing system for carrying out the method for tracing data from a data bus in a first clock domain to a trace array in a second clock domain by capturing a change of data on the data bus according to an aspect of the invention.

Referring now to FIG. 4, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

The data processing system 210 is capable of running a computer program product comprising a computer usable medium including a computer readable program, wherein the computer readable program when executed on a computer system 212 causes the computer system 212 to perform a method for tracing data 24 from a data bus 20 in a first clock domain 12 operating at a first clock frequency 14 to a trace array 22 in a second clock domain 16 operating at a second clock frequency 18 by capturing a change of the data 24 on the data bus 20, wherein the first clock frequency 14 is lower than the second clock frequency 18, comprising detecting a change of the data 24 on the data bus 20 of the first clock domain 12 by means of change detector means 26, sending a trigger pulse 34 to the second clock domain 16 by means of trigger means 28 responsive to the change detector means 26, synchronizing the trigger pulse 34 to the second clock frequency 18 of the second clock domain 16 by a meta-stability latch 36 by means of pulse synchronization means 30 of the second clock domain 16, the pulse synchronization means 30 being responsive to the trigger pulse 34, capturing data 24 from the data bus 20 and storing the captured data 25 in the trace array 22 by means of data capture means 32 on the second clock domain 16, the data capture means 32 being responsive to the pulse synchronization means 30.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, micro-controllers, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216. Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data.

Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 234, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

In accordance with one or more aspects, a hardware efficient apparatus for tracing data from an asynchronous debugging interface is provided.

In accordance with one or more aspects, a method for tracing data from an asynchronous debugging interface with a hardware efficient apparatus is provided.

Further, in accordance with one or more aspects, a data processing system for executing the method for tracing data from an asynchronous debugging interface with a hardware efficient apparatus is provided.

According to a first aspect, an apparatus is provided for tracing data from a data bus in a first clock domain operating at a first clock frequency to a trace array in a second clock domain operating at a second clock frequency, wherein the first clock frequency is lower than the second clock frequency. The apparatus includes change detector means to detect a change of the data on the data bus in the first clock domain, trigger means responsive to the change detector means to send a trigger pulse to the second clock domain, pulse synchronization means on the second clock domain responsive to the trigger pulse to synchronize the trigger pulse to the second clock frequency of the second clock domain by a meta-stability latch, and data capture means in the second clock domain responsive to the pulse synchronization means to capture data from the data bus and to store the captured data in the trace array.

The meta-stability latch, the pulse synchronization means and the data capture means are implemented as the tracing interface. The data capture means are further implemented as a latch bank.

The apparatus of one or more aspects allows for tracing data from a data bus, which may be implemented as a debug interface operating asynchronously in one clock domain at a first clock frequency, to another clock domain operating at a higher clock frequency. The data bus, e.g., may be operating in a first clock domain with an 'aclk' cycle, which is asynchronous to a core clock 'nclk' at a second clock frequency in a second clock domain. The data bus may be changing its value not faster than every four 'aclk' cycles. This data is to be traced in a trace array inside the second clock domain which, e.g., may be operating with a '2×nclk' cycle, synchronous to the core clock 'nclk'. Assumptions for the clock frequencies expressed in cycles may be that 'aclk' is less than 'nclk' cycle time. Because the data bus shall only be traced in a way, such that no data value is lost, the data value may be traced in one or more '2×nclk' cycles. In accordance with one or more aspects, every 'new' data value is written at least one time into the trace array and it is written until the next 'new' data value is available to be written.

In accordance with one or more aspects, no buffer array is needed for tracing the data from the data bus and no handling of asynchronously running read and/or write pointers are necessary. Further, data and control paths are only going in one direction from the first clock domain to the second clock domain, in one or more aspects.

The apparatus is implemented, in accordance with one or more aspects, in a hardware system where every 'new' data is written once in the trace array, no matter how long it is available on the data bus. Thus each 'new' data need be read only once. The clocks of the first clock domain with the data bus used for debugging and the second clock domain with the trace array for storing the data to be traced may run completely asynchronously to each other. The data on the data bus are read each time they may change. The phase of these data does not need to be known. The distance between the first clock domain and the second clock domain does not need to be known. The apparatus is able to trace the data on the data bus in stable conditions so that no ambiguities may result concerning previous or succeeding data. Bit width of the data bus is not limited in the apparatus, according to one or more aspects.

According to an embodiment, the data may change its value not faster than every four cycles of the first clock frequency. In this embodiment, the second clock frequency may be a core clock frequency of a computer system or computer net where the apparatus is operating. The core clock frequency, e.g., could exhibit a value of 4 GHz. Then, the data on the data bus may be traced to the data capture means with the core clock frequency and written to the trace array with half of the core clock frequency, e.g., 2 GHz in order to guarantee stable conditions with the data to be traced.

In this embodiment, data capturing with the pulse synchronization means, being part of the tracing interface, may be operating at the second clock frequency, wherein writing the captured data into the trace array is performed at half of the second clock frequency. Thus it is possible to check in a secure way if the data traced on the data bus has been changed or not in order to write the data in the trace array and does not get intermediate data just in the state of being changed on the data bus.

In one or more aspects, the apparatus may be configured so that the data and the trigger pulse are flowing from the first clock domain to the second clock domain. With this feature, the synchronization of the data only needs to be executed once and no further signals or pointers need to be sent from one clock domain to the other clock domain. This saves timing resources as well as signal lines and/or bandwidth and also verification effort.

In an embodiment, the change detector means may comprise an EXCLUSIVE-OR (XOR) circuit. This represents a quite efficient way of detecting data changes due to an EXCLUSIVE-OR (XOR) reduce circuit. Thus timing benefits as well as hardware resource benefits may be implemented due to the embodiment.

The pulse synchronization means may comprise a programmable delay for synchronization of the data capture means. By applying such a programmable delay on tracing the data on the data bus, stable conditions may be implemented for ensuring that the data being traced are stable and do not represent intermediate states due to a change from a previous to a succeeding data pattern.

The apparatus may be configured so that data capturing into the data capture means is controllable by the programmable delay of the pulse synchronization means. Thus tracing the data from the data bus may avoid getting intermediate data patterns which are just in the way of changing and/or not defined at all. The programmable delay may be optimized for the actual clock frequencies of the first clock domain and the second clock domain.

In one embodiment the apparatus may be configured so that the data capture means allows a direct capture of tracing data from the first clock domain. The data may be written in a direct way from the data bus to the trace array, because there are no buffers or registers in the apparatus where the data has to be transferred or shifted in order to be written to the trace array.

According to a further aspect of the invention, a method is provided for tracing data from a data bus in a first clock domain operating at a first clock frequency to a trace array in a second clock domain operating at a second clock frequency by capturing a change of the data on the data bus, wherein the first clock frequency is lower than the second clock frequency, comprising detecting a change of the data on the data bus of the first clock domain by means of change detector means, sending a trigger pulse to the second clock domain by means of trigger means responsive to the change detector means, synchronizing the trigger pulse to the second clock frequency of the second clock domain by a meta-stability latch by means of pulse synchronization means of the second clock domain, the pulse synchronization means being responsive to the trigger pulse, capturing data from the data bus and storing the captured data in the trace array by means of data capture means on the second clock domain, the data capture means being responsive to the pulse synchronization means.

The method according to one or more aspects of the invention may be executed on an apparatus as described above in order to trace data from a data bus, which may be implemented as a debug interface. The method may be executed on the apparatus where every 'new' data is written once in the trace array, no matter how long it is available on the data bus. Thus each 'new' data need be read only once. The clocks of the first clock domain with the data bus used for debugging and the second clock domain with the trace array for storing the data to be traced may run completely asynchronously to each other. The data on the data bus may be read each time it may change. The phase of this data does not need to be known. The method may be able to trace the data on the data bus in stable conditions so that no ambiguities may result concerning previous or succeeding data.

The method may be executed when the data changes its value not faster than every four cycles of the first clock frequency. In this embodiment, the second clock frequency may be a core clock frequency of a computer system where the method is executed on. Then the data on the data bus may be traced with the core clock frequency in the tracing interface, i.e. captured in the data capture means, and written to the trace array with half of the core clock frequency in order to guarantee stable conditions with the data to be traced.

The method may include that data capturing with the pulse synchronization means, being part of the tracing interface, is operating at the second clock frequency, wherein writing the captured data into the trace array is operating at half of the second clock frequency. Thus it is possible to check in a secure way if the data traced on the data bus has been changed or not in order to write the data in the trace array and does not get intermediate data just in the state of being changed on the data bus.

The method may further include that the pulse synchronization means comprises a programmable delay for synchronization of the data capture means. By applying such a programmable delay on tracing the data on the data bus, stable conditions may be implemented for ensuring that the data being traced is stable and does not represent intermediate states due to a change from a previous to a succeeding data pattern.

According to a further aspect of the invention, a data processing program for execution in a data processing system is provided comprising an implementation of an instruction set for performing a method as described above when the data processing program is run on a computer.

Further, a computer program product is provided comprising a computer usable medium including a computer readable program, wherein the computer readable program when executed on a computer causes the computer to perform a method for tracing data from a data bus in a first clock domain operating at a first clock frequency to a trace array in a second clock domain operating at a second clock frequency, wherein the first clock frequency is lower than the second clock frequency, comprising detecting a change of the data on the data bus of the first clock domain by means of change detector means, sending a trigger pulse to the second clock domain by means of trigger means responsive to the change detector means, synchronizing the trigger pulse to the second clock frequency of the second clock domain by a meta-stability latch by means of pulse synchronization means of the second clock domain, the pulse synchronization means being responsive to the trigger pulse, capturing data from the data bus and storing the captured data in the trace array by means of data capture means on the second clock domain, the data capture means being responsive to the pulse synchronization means.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire connection, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to block diagrams of methods, apparatus (systems) and computer program products according to embodiments of the invention. It will be understood that each block of the flowchart illustrations and/or block diagrams, and combinations of blocks in the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagram block or blocks.

Due to a further aspect of the invention, a data processing system for execution of a data processing program is provided, comprising software code portions for performing a method described above.

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

What is claimed is:

1. An apparatus for tracing data from a data bus in a first clock domain to a trace array in a second clock domain, said apparatus comprising:
    a change detector to detect a change of the data on the data bus in the first clock domain, the first clock domain operating at a first clock frequency;
    a trigger responsive to the change detector to send a trigger pulse from the first clock domain to the second clock domain signaling new data available on the data bus, and the trigger pulse being provided to the second clock domain unsynchronized to the second clock domain, the second clock domain operating at a second clock frequency, wherein the first clock frequency is lower than the second clock frequency;
    a pulse synchronization on the second clock domain responsive to the trigger pulse to synchronize the trigger pulse from the first clock domain to the second clock frequency of the second clock domain by a meta-stability latch; and
    a data capture in the second clock domain responsive to the pulse synchronization to capture data from the data bus and to store the captured data in the trace array.

2. The apparatus according to claim 1, wherein the data changes its value not faster than every four cycles of the first clock frequency.

3. The apparatus according to claim 1, wherein data capturing with the pulse synchronization is operating at the second clock frequency, and wherein storing the captured data into the trace array is performed at half of the second clock frequency.

4. The apparatus according to claim 1, wherein the apparatus is configured such that the data flows from the first clock domain to the second clock domain.

5. The apparatus according to claim 1, wherein the change detector comprises an EXCLUSIVE-OR (XOR) circuit.

6. The apparatus according to claim 1, wherein the pulse synchronization comprises a programmable delay for synchronization of the data capture.

7. The apparatus according to claim 6, wherein data capturing is controllable by the programmable delay of the pulse synchronization.

8. The apparatus according to claim 1, wherein the data capture allows a direct capture of tracing data from the first clock domain.

9. A method of tracing data from a data bus in a first clock domain to a trace array in a second clock domain, the method comprising:
  detecting a change of the data on the data bus of the first clock domain by a change detector, the first clock domain operating at a first clock frequency;
  sending a trigger pulse from the first clock domain to the second clock domain responsive to the change detector, the trigger pulse signaling new data available on the data bus, and the trigger pulse being provided to the second clock domain unsynchronized to the second clock domain, the second clock domain operating at a second clock frequency, wherein the first clock frequency is lower than the second clock frequency;
  synchronizing the trigger pulse from the first clock domain to the second clock frequency of the second clock domain by a meta-stability latch by pulse synchronization of the second clock domain, the pulse synchronization being responsive to the trigger pulse; and
  capturing data from the data bus and storing the captured data in the trace array by a data capture on the second clock domain, the data capture being responsive to the pulse synchronization.

10. The method according to claim 9, wherein the data changes its value not faster than every four cycles of the first clock frequency.

11. The method according to claim 9, wherein data capturing with the pulse synchronization is operating at the second clock frequency, and wherein storing the captured data into the trace array is performed at half of the second clock frequency.

12. The method according to claim 9, wherein the pulse synchronization comprises a programmable delay for synchronization of the data capture.

13. The method according to claim 9, wherein the data flows from the first clock domain to the second clock domain.

14. The method according to claim 9, wherein the change detector comprises an EXCLUSIVE-OR (XOR) circuit.

15. A computer program product for tracing data from a data bus in a first clock domain to a trace array in a second clock domain, said computer program product comprising:
  a non-transitory computer readable storage medium readable by a processing circuit and storing instructions for execution by the processing circuit for performing a method comprising:
    detecting a change of the data on the data bus of the first clock domain by a change detector, the first clock domain operating at a first clock frequency;
    sending a trigger pulse from the first clock domain to the second clock domain responsive to the change detector, the trigger pulse signaling new data available on the data bus, and the trigger pulse being provided to the second clock domain unsynchronized to the second clock domain, the second clock domain operating at a second clock frequency, wherein the first clock frequency is lower than the second clock frequency;
    synchronizing the trigger pulse from the first clock domain to the second clock frequency of the second clock domain by a meta-stability latch by pulse synchronization of the second clock domain, the pulse synchronization being responsive to the trigger pulse; and
    capturing data from the data bus and storing the captured data in the trace array by a data capture on the second clock domain, the data capture being responsive to the pulse synchronization.

16. The computer program product according to claim 15, wherein the data changes its value not faster than every four cycles of the first clock frequency.

17. The computer program product according to claim 15, wherein the data flows from the first clock domain to the second clock domain.

18. The computer program product according to claim 15, wherein the change detector comprises an EXCLUSIVE-OR (XOR) circuit.

19. The computer program product according to claim 15, wherein the pulse synchronization comprises a programmable delay for synchronization of the data capture.

* * * * *